United States Patent

[11] 3,611,244

[72] Inventors Kazumi Morimoto;
 Hachiro Miyao; Takeo Kuwabara, all of Yokohama-shi, Japan
[21] Appl. No. 723,865
[22] Filed Apr. 24, 1968
[45] Patented Oct. 5, 1971
[73] Assignee Tokyo Shibaura Electric Co., Ltd.
 Kawasaki-shi, Japan
[32] Priority Apr. 27, 1967, Apr. 25, 1967, June 3, 1967
[33] Japan
[31] 42/34,963, 42/34,220 and 42/46,864

[54] STABILIZING MEANS FOR ELECTRIC POWER SYSTEMS
 7 Claims, 8 Drawing Figs.
[52] U.S. Cl. ..................................... 338/55,
 317/22, 338/58, 338/267, 338/302
[51] Int. Cl. ..................................... H01c 1/08
[50] Field of Search ........................... 338/53, 55, 58, 267, 279, 296, 302

[56] References Cited
 UNITED STATES PATENTS
| | | | |
|---|---|---|---|
| 1,389,105 | 8/1921 | Simmon | 338/55 |
| 2,147,481 | 2/1939 | Beetlestone et al. | 338/55 |
| 2,715,671 | 8/1955 | Harrison | 338/58 |

Primary Examiner—Rodney D. Bennett, Jr.
Assistant Examiner—T. H. Tubbesing
Attorney—Geroge B. Oujevolk

ABSTRACT: A breaking resistor is connected to an electric power circuit remaining with light load condition during the reclosing period in the faults of said circuit. The breaking resistor comprises a coiled resistive wire wound around an axis inserted in an insulator cylinder, a plurality of insulating spacers in said coiled wire placed in such a manner that each of the adjacent turns of said coiled wire is spaced apart from the adjacent turn so that a duct to flow a cooling medium is defined by surfaces of said adjacent turns of wire and surfaces of adjacent insulating spacers.

STABILIZING MEANS FOR ELECTRIC POWER SYSTEMS

This invention relates to a means for stabilizing transmission lines, and more particularly to a stabilizer for an electric power circuit, in which said stabilizer functions as a temporary load which consumes the electric power of power systems when faults are removed from the system and during the reclosing operation of the system.

In transmission lines or systems, there are troublesome problems, such as short circuiting over two or three phases, only one line being grounded and the like. In these cases, power circuit breakers near fault positions will break out fault current and thus the power system will be separated into at least two systems. This results in the following problems as is well known, that is to say, if one of the power transmission lines separated from the others loses a heavy load, the step out current frequency in said line or the power system will be increased to a value higher than the value obtained prior to the separation from the other system by reason of the absence of the load thereof, and the mechanical input of generators connected with said transmission line will be in excess.

Such a condition causes a subsequent synchronizing operation between both separated power systems to become difficult because of the great differences in frequency or phases between said systems. Then, it is necessary to expend much time for the synchronizing connection between said two systems, and during this time period, interruption of service occurs.

Accordingly, it is necessary to provide a device to avoid interruption of service over a lengthy period of time. Usually, such a device is composed of a resistor connected to the terminal of said transmission line, in which said resistor functions as an effective dummy load to prevent its phase shifting relative to another system or another transmission line. However, there is another problem in which a high-power transmission line is of extra high voltage such as 275 kv. or 500 kv. and moreover, some troublesome problems are introduced into the design and construction thereof.

One of the problems is to provide a small size resistor which absorbs the high-tension power energy of the lost load transmission line having been released from the power station or generators. This reason is due to the fact that said resistor is used only during the reclosing cycle, and is not normally used. Another problem is directed to cooling for the dummy load or a resistor which generates much heat when it is connected with said terminal of the transmission line, in spite of the fact that said connecting period is very short, during which both the breaking out and reclosing operations of circuit breakers in said power transmission lines or systems will take place. This is caused by the fact that the voltage of the transmission line is very high, such as 275 kv., 500 kv. or more, then said resistor would be subjected to high-flow current during this period, particularly, during a duration which awaits a synchronizing connection.

Accordingly, an object of the present invention is to provide an improved stabilizer or resistor of small size and of low cost.

Another object of the present invention is to provide an improved stabilizer having an excellent cooling efficiency.

A further object of the present invention is to provide a resistor which is fabricated easily without the necessity of providing a large space with other components.

A still further object of the present invention is to provide a stabilizer which can promote stabilization on a high-tension transmission systems, which may be subjected to heavy disturbance during reclosing cycles.

Briefly stated, in accordance with the present invention, there is provided an apparatus to be connected to an electric power circuit remaining with the light load condition during its reclosing cycle, which comprises at least one coil assembly formed with spiral turns made of resistance material and wound around an axis; each of said turns being of approximately the same height on a plane across said axis, and having a space between adjacent turns. A plurality of insulating spacers are placed in said space in such a manner that adjacent spacers are positioned in a circumferentially spaced-apart relation in a winding direction of said resistance material so that a duct to flow cooling medium therein is defined by the surfaces of adjacent turns of the resistance material and surfaces of adjacent insulating spacers, and there are means for connecting said coil assembly by its terminals to said light loaded electric power circuit for a time interval achieving said reclosing cycle.

Other objects and features of the present invention will become apparent when read in conjunction with the accompanying drawings in which.

Figure 1:
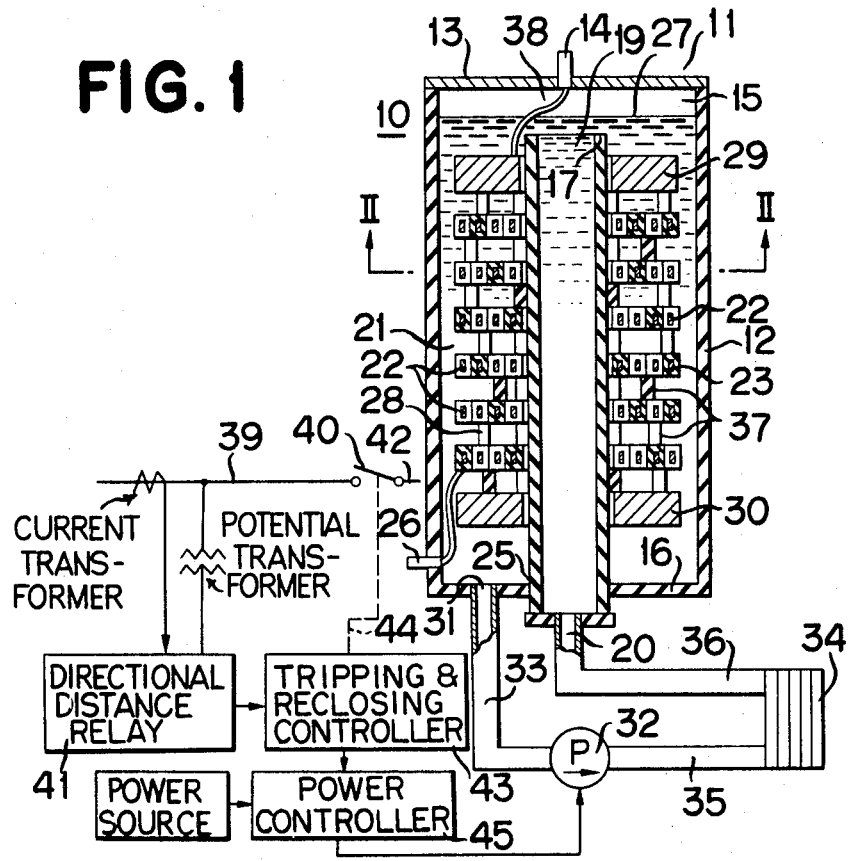
FIG. 1 is a sectional elevational view of one embodiment in accordance with this invention.

Referring now to FIG. 1, there is a stabilizer or resistor generally shown by the reference numeral 10, having an enclosure 11 which includes a tubular insulator member 12 made of a suitable insulating material such as porcelain glass reinforced epoxy resin and the like, and an oiltight top cover member 13 made of metal and which acts also as a high-potential terminal to be connected with one of transmission lines. The top member 13 has a terminal 14 to connect said transmission line thereto, and is tightly attached to an opening 15. The enclosure 11 also is provided with an opening 25 through a bottom wall 16 thereof, and a cylindrical tubular member 17, which extends through the opening 25, is provided within said enclosure 11, by aligning its longitudinal axis with the longitudinal axis of said enclosure 11. The tubular member or pipe 17 has an upper opening or outlet 19 for feeding the insulating and cooling oil into said enclosure 11 which includes several spaces of parts described hereinafter, and an inlet 20 positioned on the bottom wall of it to conduct the oil thereinto.

There is provided a winding generally shown by the reference numeral 21 wound around the tubular member 17. The winding is comprised by a long wire-shaped resistance material 22 wound in helical form, and the resistance wire may also be made as a form in bar. The wire 22 is made of material such as soft iron, silicon steel and any other suitable resistance materials which are preferable to be selected from the group having relatively a large heat capacity. Such resistance wire or element is covered with a plurality of insulating layers 23 each of which is positioned around said resistance wire or bar 22. Further they are provided on wire 22 in such a manner that each of them is spaced apart from each other along the length of said wire element 22. The insulating layers 23 are made of materials such as a combination of polyester resin and insulating paper, in which the former is placed inside the latter.

The winding 21 mentioned hereinbefore is composed of a plurality of coils 22 disposed around the cylindrical tubular member 17 with a distance along the axis thereof, wherein all of said coils 22 are approximately similar both in inside and outside diameters, respectively. These coils 22 are connected in series, one end of which is connected to a high-voltage terminal 14, and the other is connected to an earthing or neutral terminal 26 provided on the portion under the insulating tubular member 12. As is clearly shown in FIG. 1, each of the coils 22 is supported in a vertical direction to each other by supporting members 28 which serve to make cavity or space 37 which allows insulating and cooling oil to flow therethrough. The coil assembly or winding 21, also, is fixed by positioning it between both of an upper clamp plate 29 and a lower clamp plate 30. Since such clamping plate is well known in the art, the explanation thereof is omitted.

The bottom wall 16 of the enclosure 11 is provided with an opening 31. The opening 31 is connected to an oil circulating pump 32 via an oil duct 33, so that the insulating and cooling oil in the enclosure 11 is conducted into the opening 31 from the bottom portion thereof, and then the pressure risen oil resulted from forced pumping operation by the pump 32 is conducted to a cooling means 34 for said oil through a conduit or duct means 35. Any suitable form may be used as the above-mentioned oil cooler 34 as is well known in the art. Thus the coil cooled by said cooler or heat exchanger 34 is forced into the opening 20 through a conduit or duct 36, and then enters into the interior of the tubular member 17 from the bottom thereof. Thus the flow of the insulating and cooling oil will be forced to direct upwardly in the tubular member 17.

Figure 2:
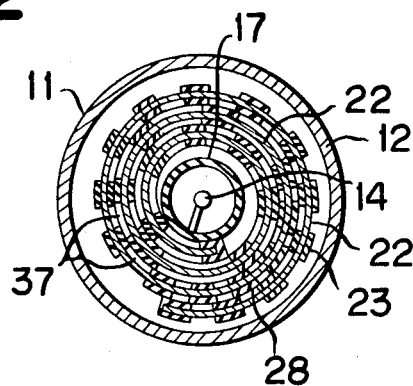
FIG. 2 is a cross-sectional view taken along a line II—II in FIG. 1.

Referring now to FIG. 2, in which the same parts are shown by the same reference numerals as those shown in FIG. 1, there is shown one of the coil assemblies 21 in such a manner that said coil assembly 21 is constructed in spiral or helical form in plane view. In the figure, it will be easily understood that many spacers or passages 28 acting as the cooling oil path are provided between adjacent insulating layers 23 along the lengthwise direction of said resistance element 22 and in a radial direction thereof, which the oil or coolant flows therethrough, and these spaces 37 are also disposed in a radially spaced relation in a plane through the diameter of coil assembly 21, and in a tangentially spaced relation to each turn of said coil assembly. Stated further, since the substantial portions of the resistance element 22 are positioned within said spaces 37 in normal state or exposed one, it will be understood that the resistance element 22 is effectively cooled by insulating and cooling oil contacting directly to said resistance element 22.

Furthermore, in accordance with the embodiment, in addition to the effectiveness mentioned above, the stabilizer or resistor for use during the reclosing cycle of transmission line can be provided without high expense by the reason of the fact that an area is provided sufficiently to remove the generated heat during the operation of resistance element 22 in actual, as is clearly shown in FIG. 2. In FIG. 2, also, it is observed that said exposed surface of resistance element 22 within the enclosure 11 exists in a space 37 between adjacent insulating layers 23, and many of these spaces 37 and exposed surfaces of resistance element 22 are provided therein. Thus the cooing effect to the stabilizer coils 22 can be increased.

Further stating, said cooling effect to the coil member 22 is more increased by forced flowing of oil by pumping with a pump 32 in such a manner that the oil heated by coil assembly 21 is absorbed from the opening 31 of the bottom wall of the enclosure 11 via an oil duct 33, then the pressurized heated oil will be sent into the cooler 34 through the duct 35, thus the oil cooled by the cooler or heat exchanger 34 is, in turn, furnished into tubular member 17 through the duct 36 and opening 20, and then the oil flows into the tubular member from the lowermost end to the uppermost opening 19 thereof. Thus the oil flows into the level 27, above which a gas pressure compensating chamber 38 absorbing both the increase and decrease in volume thereof according to the variation of the ambient temperature is provided. In accordance with such a forced cooling system, it is clear that the size of the stabilizer 10 can be designed extremely small without high expense. As is clearly seen in FIG. 2, the spaces or passages 37 are arranged in zigzag form along the longitudinal axis of the enclosure 11. This results in turbulence flow in spaces 37 between adjacent coils 22 respectively, which contributes to cooling the resistance element 22 quickly, thus it will be apparent that cooling effect for the coil assembly 21 is so high that the stabilizer 10 having a small size can be obtained without high expense.

In order to run the pump 32 during only the time of interval relating to the reclosing cycle to reduce the idle expense of electric power to the motor of pumping means, there is provided some additional devices as follows. Generally, in the transmission lines, protection devices are provided therein. One of such devices is a distance relaying protecting means which acts to break the section on the transmission line to be protected upon occurrence of faults, for example, short circuiting between two phases or among three phases of said transmission line.

Referring to FIG. 1 again, there is generally shown the transmission line to be reclosed after the removal of the faults as reference numeral 39, and the right-hand portion thereof is connected to a single power source and the left-hand one is connected through any suitable circuit breaker, which acts to remove the faults caused on line 39, to another source in which of course said both of opposed sources are held the synchronization between them during normal operation, in that time the circuit breaker 40 is closed. It is not necessary to explain the arrangement of the relation between said sources and transmission line 39 as it is well known in the art.

As is well known, there is provided a relaying means 41 such as distance relay, directional distance relay and the like on the terminal of the transmission line. The terminal has any suitable fault detecting means such as high speed over current relay, high speed under voltage relay, zero phase over voltage relay and the like not shown. The latter will detect the fault caused on the transmission line 39, and it will cooperate with said distance relaying means 41, causing conventional carrier protection devices to function in the usual manner. Briefly stating, the function of them, when a fault such as short circuiting occurs on the section to be protected, said fault detecting means will detect it first, approximately at the same time distance relaying system 41 functions, which, in turn, causes the carrier means to function to detect if the fault exists in the section to be protected. If said fault exists in said section, these protecting means will function to break out the circuit breakers of the terminal by cooperating with each other, thus the fault will soon be removed from the transmission line, and then the arc or ionized atmospheric gas in an arc extinguishing chamber of the circuit breaker 40, at the same time, when breaking operation starts, the reclosing cycle will start. The stabilizer 10 is immediately connected to any point, for example, terminal of line 42 which is near the power source not shown. The line or power system 42, in which the stabilizer 10 is connected, is one which has become to a light load according to breaking out the heavy load thereon. Thus the remaining light load power system 42 will be possible to maintain a relatively stabilized state for the reason of connecting the stabilizer 10 in system 42. If another remaining power source which is at left hand of the transmission line 39 not shown, has a heavier load than said source, it is not necessary to connect the stabilizer because of the fact that if this is done, said remainder system must have a more increased load than the previous one.

In order to achieve this, there is provided a controller 43 having linkage means 44 to open and close the circuit breaker 40, and which is controlled by the output of protecting relaying systems 41, and the output of said reclosing controlling means 43 generates the signal to force a power controlling means 45. Thus the latter controlling means 45 yields to operate the motor in pumping means 32.

It is apparent that the stabilizer 10 is connected in power system during only the reclosing cycle, and the pumping means 32 is driven only during the same time interval.

Figure 3:
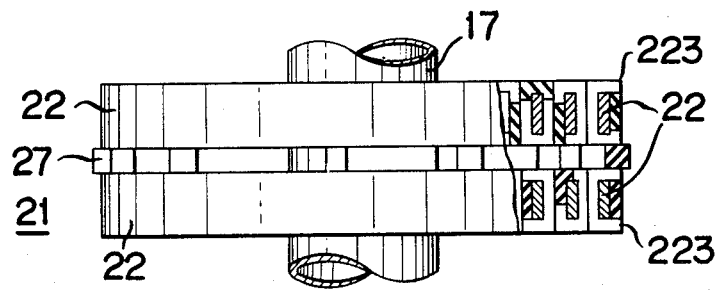
FIG. 3 is an elevational view of another modification, partly broken away and in section of the stabilizer according to the invention.
Figure 4:
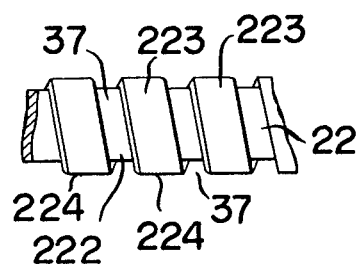
FIG. 4 is a front view, partly broken away, of a portion of a resistor element shown in FIG. 3.

In accordance with the present invention, the coil assembly 21 may be constructed as shown in FIG. 3, in which the same parts are shown by the same reference numeral as FIGS. 1 and 2, and their explanation will be omitted. The construction of the coil assembly 21 is similar to that of the one shown in FIGS. 1 and 2, excepting an insulating web 223 is wound around the resistance material 22 with helical form along the longitudinal direction thereof, as is clearly shown in FIG. 4. The insulating material or web 223 may be composed of a plurality of continuous helical rings 224 arranged lengthwise along said resistance element 22, in which each of said helical rings 224 is arranged in lengthwise spaced relationship between and against edges of adjacent rings, thus the spaces 37 or oil ducts for cooling the resistance element are formed between the adjacent rings, respectively.

In accordance with this embodiment, because of the fact that each of the coil assemblies 21 is provided with continuous helical insulating web thereon, its winding operation will be achieved with extreme ease so that the stabilizer according to the present invention can be provided without high cost. As the intermediate portions or exposed portions 222 positioned between the adjacent rings 224 are directly exposed to oil, the cooling effect will become extremely large. Thus it is easy to provide a stabilizer of small size, as is evident to those skilled in the art.

Figure 5:
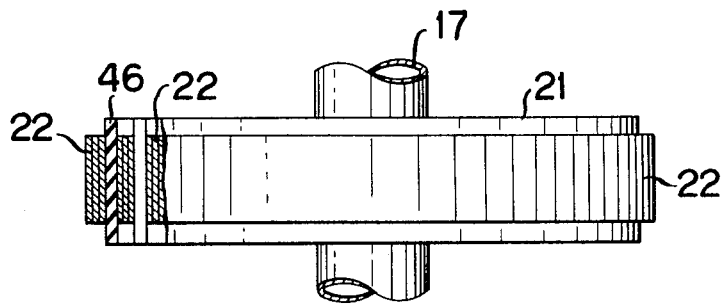
FIGS. 5, 6, 7 and 8 are views of resistor elements, partly in section and partly broken away, of further embodiments according to the invention.

In another embodiment shown in FIG. 5, it is seen that a coil assembly 21 comprising a coil member 22 is wound around tubular member 17 which acts to pass the insulating and cooling fluid therethrough, as mentioned above. The resistance element 22 is constructed by three layers of web made of silicon steel material, which is edgewise wound around said tubular member 17 so that said webs define a helical form on said tubular member 17. Each of the helical turns 22 is radially separated from each other by spacer members 46 disposed between said adjacent turns, in which said spacer member is constructed in the form of a bar of any suitable insulating materials such as glass reinforced polyester resin or phenol resin and the like, and the insulating bar is of larger size in length than the width or height of web of resistance element 22. Thus, there is no dangerous short circuiting between adjacent coils or resistance elements 22 which are in stacked relation in an axis thereof.

Though the spaces or oil ducts are not shown in FIG. 2, it will be easily understood that they are provided between the bars circumferentially spaced apart from each other.

Figure 6:
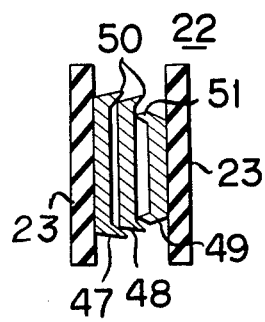

In accordance with another embodiment shown in FIG. 6, a portion of a coil 22 of the coil assembly 21 is shown in cross section, wherein said coil 22 comprises three webs 47, 48 and 49 made of silicon steel web, which are wound around the cylindrical member or tube as shown in FIG. 5. The two strips 47 and 48 are shown as having the same dimensions in height or width, and arranged in edgewise relation to one another. However, the remaining one strip or web 49 has a width or height narrower than said two webs 47 and 48. This reason is as follows.

Generally speaking, when the opposite edges of the strip are cut away from the web material or sheet, there will happen a sharp edge 50 alongside of said web material or strip. If the sharp corner of the edge is against the insulator the front end of said sharp edge 50 will be cut into the insulating material between adjacent turns of resistance element 22, and finally the insulating characteristics of said insulator 23 is destroyed. But, in accordance with the constructing mentioned above, each of the front ends 50 on the sharp edges of said webs is arranged far from the surface of said insulator 23. As is seen in the figure, the sharp edges 51 of the narrow web 49 or strip are directed to the adjacent strip 48, and the edges are not directed to the surface of the right-hand insulator 23. The insulating material disposed between the adjacent resistance elements 22 will not be destroyed by being cut into said insulator. Thus the stabilizer will be durable for a long time.

Figure 7:
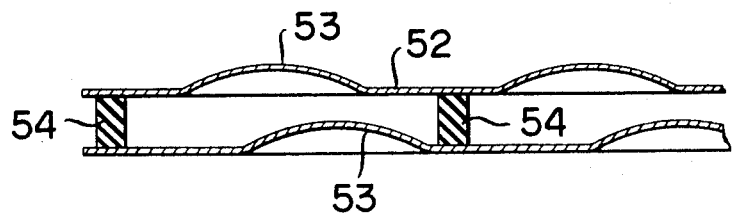

In FIG. 7, there is shown a further embodiment of the present invention, in which a strip or web-shaped resistance element 52 is provided with a plurality of dimples 53 along the lengthwise direction of said web 52. MOre particularly, these dimples 53 are disposed on the web or strip 52 in such a manner that they are positioned on the strip 52 with a spaced-apart relation from each other along the lengthwise direction of said strip. Of course, said plurality of dimples 53 may be provided on the strip 52 in such a manner that, for example, two rows of them are in a direction of longitudinal centerline of the strip 52 may construct a zigzag form to said centerline of the strip 52. The strip 52 having such a construction is wound around the tubular member 17 as is seen in FIGS. 1, 2, 3 and 5. In that case, a plurality of the insulating bars 54 running parallel with the axis of said tubular member prevent adjacent turns from radially touching, respectively. Thus, the cooling effect of the resistance element or strip 52 will become larger than the case without such dimples for the reason of that many of said dimples 53 having extended heat radiation surface are positioned within oil ducts or spaces 37 and these dimples 53 are directly contacted the cooling medium or insulating oil flowing through it in a direction vertical to the drawing, then they will be capable of absorbing much quantity of heat from said dimples 53 and thus the resistance element 52 is highly cooled.

Said dimples 53 on the strip or resistance element 52 will be easily made by using a known pressing operation.

Figure 8:
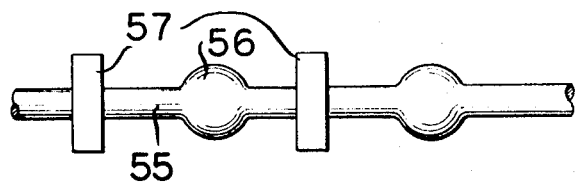

It is possible to use resistance material 55 in the form of wire shown in FIG. 8. The resistance element of this embodiment is made of an iron rod or wire 55 having a circular cross section. The element 55 is wound in a coil form after successive operation including pressing successive portions spaced from each other along lengthwise direction of said rod material 55. This, a plurality of flat portions are formed in a spaced relation along the lengthwise direction of said rod material 55, of which the opposite heat radiation surfaces are positioned in an oil duct or spaces through which the coolant or insulating oil flows. The flat portions 56 are positioned in an oil duct, flowing coolant through which, in such a manner that the opposite surfaces of each flat portions 56 are stood in said duct, in other words, said opposite surfaces of flat portions are arranged approximately parallel with the flow of the coolant or an axis of tubular member as explained in FIGS. 1, 2, 3 and 5, and the effect of them is similar to that of the embodiment shown in FIG. 7. However, with this modification in FIG. 8, it is seen that it is possible to use a steel rod or wire having standard dimension and which is commercially available. The stabilizer of transmission lines or power systems is provided without much labor and high cost. Also the reference numeral 57 shows the insulators between adjacent turns of resistance element 55.

In above embodiments of the present invention, the coil assemblies arranged in the enclosure commonly alternately invert the winding direction to reduce the inductance through the whole series circuit of the coil assembly.

The stabilizer mentioned above is adopted to use atomic power generating installations. In FIG. 1, the terminal or line 42 may be used as the terminal of the generator in said atomic power installation. As is well known in the art, an atomic power reactor is generally used under the condition of generating uniform electric power for the reason of the fact that once the reactor is stopped with any fault resulted from breaking down the generator out of power system according to the fault such as short circuiting on transmission lines or buses to be connected with said generator, the restarting of said atomic power reactor will expend extremely long time interval, since the safety rods or shims will be entered into active core and vice versa, to stop the reaction of said reactor. Thus, in the conventional protecting systems, there are provided means for avoiding such a fault as the reactor stops the reaction thereof. To this end, the protecting systems act to exhaust the fission steam irradiated with the fuel positioned in said vessel into an enclosed condenser, in which said condenser causes all of the fission steam generated within said reactor or boiler to condense therein without exhausting to ambient atmosphere. Then the main shutout valve of the turbine closes to stop the steam to the turbine wheels, and at the same time the generator will be broken out of bus forced by thereof, also said stabilizer will be connected to the terminal of said generator. Thus, the dynamic brake functions on generator, and it reduces the speed to a value near a rated synchronous one without going to over speed which is higher than the rated one.

Thus, it will be clear to those skilled in the art that, after the above-mentioned protecting operation is finished the stabilizer or breaking resistor will come to cut out of the terminal of the turbogenerator, and that the set of turbogenerator is continued to run with approximately rated speed of it.

After this, and after the fault in system has been removed therefrom, said turbogenerator will be connected again to said power system, and the fission steam which has been exhausted into said condenser will be again conducted to the turbine in lieu of said condenser.

Thus, the reclosing cycle is terminated, and the synchronous connection between said generator and power system will be easily achieved without stopping the nuclear reactor for a long period extending over a few hours or a few days.

While the principles of the invention have been described above in connection with specific embodiments, and particular modifications thereof, it is to be understood that this description is made only by way of example and not as a limitation on the scope of the invention.

We claim:

1. An apparatus adapted to be connected to an electric power circuit maintained under light load conditions during its reclosing cycle, which comprises:
   a. an enclosed vessel;
   b. at least one coil assembly including terminals with a plurality of coils each of which is formed with spiral turns made of resistance material and wound around a tubular member, said tubular member and coil assembly being positioned within said vessel;
   c. each of said turns being disposed with substantially the same height on a plane across said tubular member, and having a space between the adjacent turns, a plurality of insulating spacers placed in said space in such a manner that the adjacent spacers are positioned in a winding direction of said resistance material so that a duct for flowing cooling medium therein is defined by the surfaces of said adjacent turns of the resistance material and surfaces of said adjacent insulating spacers;
   d. an insulating and cooling medium sealed in said duct and a means for pumping said medium;
   e. a heat exchanger;
   f. means for serially connecting said vessel, pumping means, heat exchanger and said tubular member; and,
   g. means for connecting said coil assembly by its terminals to said light loaded electric power circuit for a time interval attaining said reclosing cycle.

2. An apparatus according to claim 1, in which said spiral turns are made of at least one long web or wire formed of resistance material, and a plurality of insulating rings which also act as spacers are positioned around said resistance material in such a manner that said rings are disposed around in spaced-apart relations longitudinally along said material.

3. An apparatus according to claim 1, in which said spiral turns of resistance element are composed of at least one long web or wire formed of resistance material and a long insulating material spirally wound thereon, whereby a space or duct to pass a coolant therethrough is provided between adjacent spiral turns of the resistance element.

4. An apparatus according to claim 1 wherein said coil assembly is composed of a plurality of webs or strips of resistance materials which are spirally wound around the same axis in integrally lapped edgewise relationship, and a plurality of insulating bars or rods arranged between adjacent turns including integrally lapped webs or strips therein respectively, said bars or rods being disposed between adjacent turns in circumferentially spaced-apart relations, and the rod or bar member being in parallel with said axis.

5. An apparatus according to claim 4 wherein said webs or strips are composed of at least two sheets lapped edgewise in radial direction to coil axis, one of them having a longer width or a higher height to said axis than another one, both of sheets being lapped with each other to direct sharp edges of opposed sides toward each other, said sharp edges being positioned far from insulating spacers interposed between the adjacent turns, and said another one or narrow one being held in opposed sharp edges of said wider one.

6. An apparatus according to claim 1 wherein said spiral turns made of resistance material are composed of web or strip, and said web or strip is provided with a plurality of dimples to transmit self-generating heat for an ambient atmosphere of coolant thereon, said dimples being disposed on longitudinally spaced-apart relation of said web or strip and positioned in said duct flowing through said coolant, in which said web or strip is disposed in such a manner that the direction of its width or height is in parallel with said axis of the coil assembly.

7. An apparatus according to claim 1 wherein said spiral turns made of resistance material are made of a long wire material having a circular cross section, said wire material being provided with a plurality of flat portions whose surfaces are positioned in said duct in such a manner that said flat portions are arranged in parallel with said axis of coil assembly and said portions are longitudinally spaced apart along said wire material.